Feb. 26, 1957 W. JOHNSON 2,782,736
MACHINE FOR FORMING FEED PELLETS
Filed Oct. 3, 1955 2 Sheets-Sheet 1

INVENTOR.
WILLIAM JOHNSON
BY Rudolph L. Lowell
ATTORNEY.

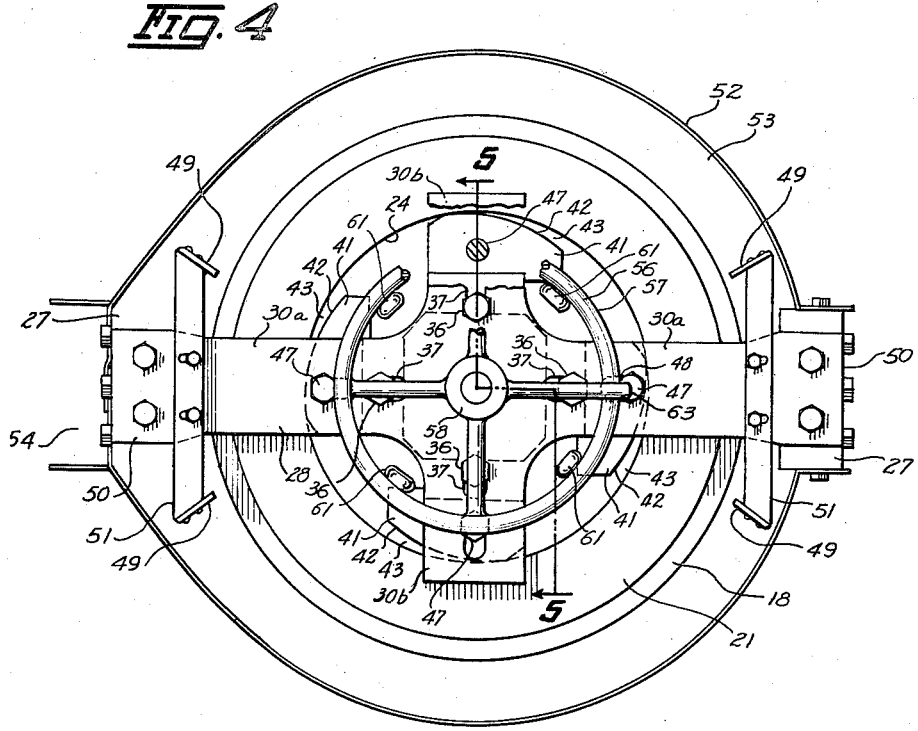

United States Patent Office 2,782,736
Patented Feb. 26, 1957

2,782,736

MACHINE FOR FORMING FEED PELLETS

William Johnson, Des Moines, Iowa

Application October 3, 1955, Serial No. 538,210

2 Claims. (Cl. 107—14)

This invention relates generally to machines or mills for preparing livestock and poultry feeds and more particularly to a machine for forming such feed in a pellet form.

An object of this invention is to provide an improved feed pelletizer machine.

A further object of this invention is to provide a feed pelletizing machine which includes a rotatable perforated die ring which coacts with a stationary feed compressing member to extrude cylindrical feed pieces which are broken off into pellets by stationary breaker members arranged adjacent to the outside of the die ring.

Another object of this invention is to provide a feed pelletizing machine which includes a rotatable perforated die ring and a plurality of feed compressing members, arranged within the die ring for extruding feed therethrough, and in which the feed compressing members are positively maintained in an adjusted position within the die ring.

A further object of this invention is to provide a feed pelletizing machine which includes a perforated die ring and a coacting feed compressing member which is mounted for adjustable movement relative to the die ring so that a predetermined desired spacing between the ring and the member can be maintained after machining of the die ring for wear.

Still a further object of this invention is to provide a feed pelletizing machine which is simple and rugged in construction, economical in cost and maintenance, and efficient in operation to form feed pellets of a desired size.

Further objects, features and advantages of this invention will become apparent from a consideration of the following description when taken in connection with the accompanying drawing in which:

Fig. 4 is an enlarged top plan view of the feed pelletizing machine of this invention, with some parts broken away and other parts shown in section for the purpose of clarity; and Fig. 5 is an enlarged fragmentary sectional view of a portion of the feed pelletizing machine of this invention.

Figure 1:
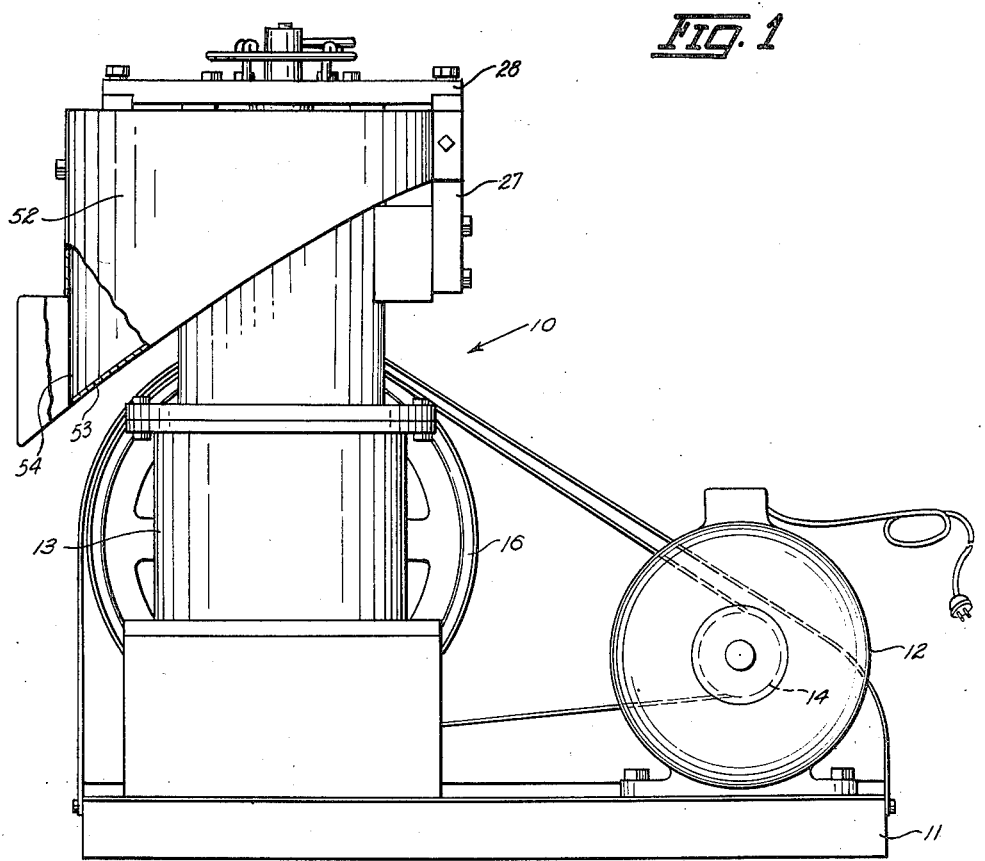
Fig. 1 is a side elevational view of the feed pelletizing machine of this invention, with some parts broken away and other parts shown in section for the purpose of clarity.

With reference to the drawing, the feed pelletizing machine of this invention, indicated generally at 10, is illustrated in Fig. 1 as including a base 11, and an electric motor 12 and an upright tubular supporting structure 13 arranged in a side by side relation on the base 11. A drive pulley 14 on the motor 12 drives a driven wheel 16 carried on and arranged to one side of the supporting structure 13. The wheel 16 in turn drives an upright shaft 17 supported on and extended axially of the tubular supporting structure 13.

Figure 2:
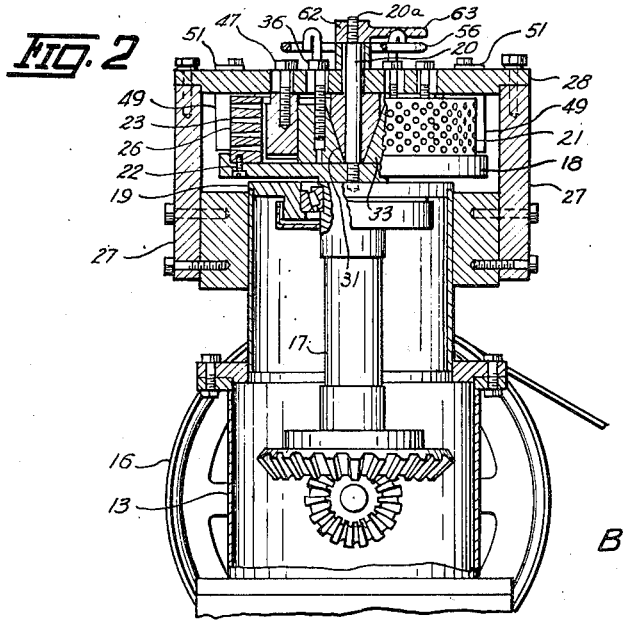
Fig. 2 is a fragmentary longitudinal sectional view of the feed pelletizing machine of this invention, with a portion of the die ring being shown in elevation.
Figure 3:
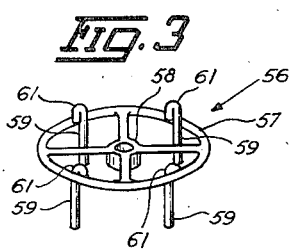
Fig. 3 is a detail perspective view of the feed agitator unit used in the feed pelletizing machine of this invention.

Secured to the shaft 17 for rotation therewith is a horizontal table or platform 18 (Fig. 2) arranged above the upper end 19 of the tubular supporting structure 13. An upright tubular die ring 21 (Fig. 2) secured, as by bolts 22, only one of which is shown, to the table 18, extends upwardly therefrom in a coaxial relation with the shaft 17. As best appears in Figs. 2 and 5, the die ring 21 is formed with perforations 23 extended between the inner and outer faces 24 and 26, thereof, respectively. The perforations or openings 23 are uniformly tapered so as to be of a smaller diameter at the outer face 26 than at the inner face 24 for a purpose to appear later.

Extended upwardly from the shaft 17, and forming an upper extension thereof, is a smaller shaft 25 having its upper end 20 arranged above the die ring 21. Thus, on operation of the motor 12, the shaft 17 operates to rotate the die ring 21 and the shaft extension 25 which extends axially through the die ring 21.

Rigidly supported on a pair of upright bars 27 secured to and extended upwardly from the tubular supporting structure 13, is a horizontal support member 28 positioned above and extended diametrically across the die ring 21. As best appears in Fig. 4, the support 28 is of a generally cross shape, having a first pair of arms 30a secured to the upright bars 27 and a second pair of shorter arms 30b extended transversely of the arms 30a. Integrally formed on the support 28 and extended downwardly therefrom (Figs. 2 and 5) is a bearing member 29 having four identical downwardly and inwardly inclined faces 31 formed at the lower end thereof. A central opening 32 formed in the support member 28 and extended through the bearing member 29 has the shaft extension 25 extended therethrough.

Four block or wedge members 33 (Figs. 2 and 5) corresponding to the inclined faces 31 on the bearing member 29, are each provided with an inclined face or side 34 of an inclination corresponding to the inclination of the bearing member faces 31. The block members 33 are arranged such that their inclined faces 34 are positioned in engagement with the correspondingly inclined faces 31 of the bearing member 29. Each block member 33 is adjustably supported on the support member 28 for up and down movement relative thereto. Four bolts 36 extended through corresponding slots 37 in the support 28 and received in threaded openings 35 in the block members 33 provide for such adjustable support.

Four feed compressing members or shoes 41 (Figs. 2, 4 and 5), corresponding to the block members 33, are arranged outwardly of the block members 33. Each shoe 41 is of a partially cylindrical shape having an upright cylindrical face or side 42 which is eccentrically arranged relative to the inner face 24 of the die ring 21. As a result of this eccentric mounting a space 43 of a progressively decreasing size in a counterclockwise direction as viewed in Fig. 4, is formed between the shoe faces 42 and the die ring 21. Opposite its face 42, a shoe 41 is provided with an upright flat face 44 positioned against a corresponding flat upright face 46 on the corresponding wedge 33. Upright bolts 47 extended downwardly through corresponding slots 48 in the support 28 are threadably received in upright openings 45 in the shoes 41 for supporting the shoes 41 in a depending relation with the support 28. Each shoe 41 is thus mounted for adjustable movement toward and away from the adjacent portion of the die ring 21 on loosening of the corresponding bolt 47 and movement of the bolt 47 in the slot 48 therefor.

In the use of the machine 10, livestock or poultry feed in the usual granular form is delivered into the die ring 21 and onto the table 18 from a hopper or the like (not shown) positioned above the machine 10. On operation of the motor 12, the die ring 21 is rotated in a counter-clockwise direction as viewed in Fig. 4 so that the feed therein is progressively packed within the spaces 43 between the ring 21 and the shoes 41, which spaces 43 progressively decrease in size in the direction of rotation of the die ring 21. As a result, feed is progressively pressed and forced through the die openings 23 wherein it is further compressed by virtue of the tapered shape of the openings 23 (Fig. 5).

It is seen, therefore, that on rotation of the die ring 21, feed is continuously extruded through the die ring 21, with this feed emerging from the die openings 23 in a rod or stick form. Four breaker members 49 carried on the opposite ends of a pair of mounting bars 51 corresponding to the arms 30a for the support 28 act to continuously break off the ends of such feed rods into pellet size pieces. As best appears in Figs. 2 and 4, the mounting bars 51 are adjustably supported on the arms 30a, adjacent the outer ends 50 thereof, to provide for adjustable movement of the breakers 49 toward and away from the outer face 26 of the die ring 21. As a result, the breaker members 49 may be adjusted to positions spaced from the die ring 21 such that they break rather than shear the extruded feed rods. Accordingly, the fine feed material which results from a shearing action is avoided.

It is seen, therefore, that a breaker member 49 is provided for each shoe 41 for breaking off the feed rods extruded through the die ring 21 by the shoes 41.

As best appears in Figs. 1 and 4, a pellet receiving chute unit 52 extends about the die ring 21 and is secured to the upright support bars 27. The chute 52 includes an inclined bottom member 53 which directs the feed pellets through an outlet 54 onto a conveyor or the like (not shown). The pellets are cooled after travel off the chute unit 52 and are then directed into bags.

During operation of the machine 10, the granular feed in the die ring 21 is continuously agitated by means of an agitating unit 56 (Figs. 1, 2 and 3 and 4) mounted on the shaft extension 25 at a position above the die ring 21. The unit 56 includes a ring member 57 having a hub 58 which rests on the support 28 and is loosely received about the shaft extension 25. Secured to and extended downwardly from the ring 57, at positions between the shoes 41, are four rods or bars 59 formed at their upper ends with loops 61 positioned above the ring 57.

A cap member 62, releasably attached to the shaft extension 25 at a position above the hub 58, includes a radially extended arm 63. On rotation of the shaft extension 27 the arm 63 selectively engages a loop 61 on the ring 57 whereby the ring 57 is tipped downwardly as each loop is engaged. As a result, the unit 56 is continually rocked or tipped in up and down directions to agitate the feed in the ring 21. Further, by virtue of the loose mounting of the hub 58 on the shaft extension 25, the unit 56 is also rotated back and forth somewhat between the adjacent shoes 41 by the arm 63.

From the above description it is seen that this invention provides a compact feed pelletizing machine 10 having a minimum number of moving parts. When the inner face 24 of the die ring 21 becomes worn or cupped by virtue of the frictional engagement of the feed therewith, the ring 21 is readily removed and machined to provide a smooth cylindrical face 24. After such machining of the die ring 21, the bolts 36 and 47 for each wedge 33 and its corresponding shoe 41, respectively, are loosened. Each wedge 33 is then moved upwardly, on manipulation of the supporting bolt 36 therefor, with the inclined face 34 thereof riding on the corresponding inclined face 31 for the bearing member 29. Such movement of a wedge 33 moves the corresponding shoe 41 outwardly to a position providing for a desired space 43 between the shoe 41 and the die ring 21.

In one embodiment of the invention, the shoes 41 are spaced about .015 inch from the die face 24 at the points on the shoes 41 closest to the face 24.

It is to be noted that in the use of the machine 10, no fluid or other binding material is required in forming a granular feed material into pellets. It is believed that the natural oils and other fluids in the feed material act as the binder as the result of the compressing action of the shoes 41 on the feed.

Although the invention has been described with respect to a preferred embodiment thereof, it is to be understood that it is not to be so limited since changes can be made therein which are within the scope of this invention as defined by the appended claims.

I claim:

1. In a feed pelletizing machine, a base, an upright perforated die ring rotatably mounted on said base, a support member extended across said ring at a position above the ring and fixedly supported on said base, a pair of feed compressing members movably mounted on said support member and arranged within said ring adjacent diametrically opposite portions thereof, a bearing member arranged between said compressing members and having vertically inclined sides facing said compressing members, a pair of block members movably supported on said support member and corresponding to said compressing members, with each block member having an inclined side engaged with an inclined side of said bearing member and an opposite side engaged with a corresponding compressing member, whereby on movement of a block in one direction along an inclined side of said bearing member, the corresponding compressing member is moved in a direction toward said die ring.

2. In a feed pelletizing machine, a base, a die ring rotatably mounted on the base, a support member extended across said die ring at a position above said die ring and fixedly supported on said base, feed compressing members adjustably mounted on said support member for movement radially of said die ring and arranged within said die ring, a bearing member common to said compressing members, and wedge members corresponding to said compressing members adjustably mounted on said support member for movement vertically and radially of said die ring, and arranged at positions to frictionally engage said bearing member and a corresponding compressing member, whereby on vertical movement of a wedge member in one direction the corresponding compression member is radially moved toward said die ring.

References Cited in the file of this patent

UNITED STATES PATENTS

| | | |
|---|---|---|
| 2,160,302 | Billows | May 30, 1939 |
| 2,167,900 | Meakin | Aug. 1, 1939 |
| 2,565,830 | Weston | Aug. 28, 1951 |
| 2,642,011 | Sizer | June 16, 1953 |
| 2,647,474 | Popick | Aug. 4, 1953 |
| 2,700,941 | Johnson | Feb. 1, 1955 |